(12) United States Patent
Abate et al.

(10) Patent No.: US 11,137,137 B2
(45) Date of Patent: Oct. 5, 2021

(54) METHOD FOR DRIVING A VALVE FOR REGULATING THE FLOW RATE OF FUEL GAS TOWARDS A BURNER, IN PARTICULAR FOR CONDENSATION BOILERS HAVING HIGH POWER MODULATION

(71) Applicant: SIT S.P.A., Padua (IT)

(72) Inventors: Maurizio Achille Abate, Bologna (IT); Maurizio Marcantonio, Picerno (IT); Giancarlo Pirovano, Martellago (IT)

(73) Assignee: SIT S.P.A., Padua (IT)

( * ) Notice: Subject to any disclaimer, the term of this patent is extended or adjusted under 35 U.S.C. 154(b) by 357 days.

(21) Appl. No.: 16/302,197

(22) PCT Filed: May 9, 2017

(86) PCT No.: PCT/EP2017/061005
§ 371 (c)(1),
(2) Date: Nov. 16, 2018

(87) PCT Pub. No.: WO2017/198493
PCT Pub. Date: Nov. 23, 2017

(65) Prior Publication Data
US 2019/0316774 A1 Oct. 17, 2019

(30) Foreign Application Priority Data
May 18, 2016 (IT) .................. 102016000051162

(51) Int. Cl.
*F23N 1/00* (2006.01)
*F16K 31/06* (2006.01)
(Continued)

(52) U.S. Cl.
CPC .......... *F23N 1/005* (2013.01); *F16K 31/0675* (2013.01); *F23L 5/02* (2013.01);
(Continued)

(58) Field of Classification Search
CPC ........ F16K 31/0675; F23L 5/02; F23N 1/002; F23N 1/005; F23N 2235/14;
(Continued)

(56) References Cited

U.S. PATENT DOCUMENTS 4,785,846 A 11/1988 Kragten
4,880,157 A * 11/1989 Boot ...................... F23N 1/002
236/25 R (Continued)

FOREIGN PATENT DOCUMENTS

EP 0800039 A1 10/1997
WO 2009015155 A1 1/2009
(Continued)

*Primary Examiner* — Steven B McAllister
*Assistant Examiner* — Benjamin W Johnson
(74) *Attorney, Agent, or Firm* — Volpe Koenig (57) ABSTRACT

A method for modulating a valve regulating the flow rate of gas towards a burner is presented. The valve with the associated closure member configured to operate with a predetermined characteristic curve, the flow rate delivered being proportionally related to the strength of a first current signal sent to the modulator such that the flow rate can be modulated, using the proportionality, within a range of modulation between a maximum flow rate and a minimum flow rate. To deliver controlled gas flow rates that are below the minimum flow rate, the modulator is driven with a second PWM voltage signal capable of generating a particular second PWM current signal, to move the closure member of the valve according to the second signal. First and second time intervals correspond to successive durations of high signal and low signal, respectively, the sum being equal to a period of the second signal.

7 Claims, 6 Drawing Sheets

(51) Int. Cl.
   *F23L 5/02* (2006.01)
   *G05D 7/06* (2006.01)
   *H01F 7/06* (2006.01)
   *H01F 7/18* (2006.01)
   *F24H 8/00* (2006.01)

(52) U.S. Cl.
   CPC ............ *F23N 1/002* (2013.01); *G05D 7/0635* (2013.01); *H01F 7/064* (2013.01); *H01F 7/18* (2013.01); *F23N 2235/14* (2020.01); *F23N 2235/16* (2020.01); *F23N 2237/10* (2020.01); *F24H 8/00* (2013.01); *H01F 2007/1888* (2013.01)

(58) Field of Classification Search
   CPC .... F23N 2235/16; F23N 2237/10; F24H 8/00; G05D 7/0635; H01F 7/064; H01F 7/18; H01F 2007/1888

USPC ........................................................ 122/14.2
   See application file for complete search history.

(56) References Cited

U.S. PATENT DOCUMENTS 5,735,503 A        4/1998   Hietkamp
   6,401,669 B1 *     6/2002   Macgowan ............... F24H 1/43
                                                         122/448.1
   2010/0310997 A1*  12/2010   M gica Odriozola .... F23N 5/16
                                                             431/8
   2015/0330664 A1*  11/2015   Furmanek ................. F23N 5/24
                                                          122/14.2

FOREIGN PATENT DOCUMENTS

WO      WO-2013017346 A1 *  2/2013  ............... H01F 7/18
   WO         2014060991 A1    4/2014

* cited by examiner

METHOD FOR DRIVING A VALVE FOR REGULATING THE FLOW RATE OF FUEL GAS TOWARDS A BURNER, IN PARTICULAR FOR CONDENSATION BOILERS HAVING HIGH POWER MODULATION

TECHNICAL FIELD

The present invention relates to a method for driving a modulating valve for regulating the flow rate of fuel gas towards a burner, in particular for condensation boilers having high power modulation, having the features set out in the preamble of main claim 1.

TECHNOLOGICAL BACKGROUND

In the technical field of gas-operated condensation boilers, there is the need to vary the flow rate of gas in a manner coordinated with the flow rate of air so as to keep the air/fuel ratio within a narrow interval corresponding to combustion which is optimised both for gas emissions and for consumption.

In conventional condensation boilers, this is achieved by way of a device through which the air is passed and which, by way of a variable-section configuration in the airflow direction in a convergent/divergent profile, creates a depression, of a magnitude which is dependent on the strength of the airflow, in one of said sections by the Venturi effect. Said depression section is placed in communication with the outlet of a gas-regulation valve which delivers a gas flow rate corresponding to the size of said depression. The gas thus delivered is mixed with the air at the point at which the depression signal is sampled. In the relevant technical field, the aforementioned device is often referred to as a Venturi mixer.

The limitations of a solution of this type are known. The Venturi mixer carries out its function correctly in a limited range of air flow rates (defined between maximum flow rate and minimum flow rate values). In particular, for air flow rates below a particular value, the depression signal is too low to be detected by the gas-modulation valve.

For air flow rates close to the minimum flow rate value, the gas-modulation valve exhibits imprecise behaviour, in which the correspondence of the depression to the gas flow rate is no longer valid; thus, under these conditions, the device is unsuitable for achieving precise gas metering.

In condensation boilers, the use of electronic fuel control has been introduced, which is distinguished from pneumatic control in that means for detecting the quality of the combustion are provided downstream thereof, by means of suitable sensor devices positioned in the flame or along the course of the combustion fumes. These sensor devices provide a signal which, after suitable processing operations, provides a signal for correcting the amount of air or gas to be supplied in order for the combustion to be brought back within the desired conditions. To do this, valves are used which regulate the flow of gas by way of an electrical signal which acts on a modulator positioned in the valve, rather than by way of a pressure signal. In this way, namely by controlling the combustion using closed-loop regulation, numerous advantages can be achieved, for example a larger range of modulation, the possibility of adapting automatically to a different type of gas (specifically having a different Wobbe index), a simpler installation procedure for the boiler, self-calibration of the boiler during operation thereof, automatic diagnosis of any faults, and similar auxiliary functions. These functions are linked to the fact that the quality of the combustion is directly detected downstream thereof, and air and gas are not simply regulated upstream of the combustion, and thus in an open loop, without knowing the resultant effect of this mixture on the combustion. Again, a limitation of this second type of solution lies in the size of the range of power modulation (Pmin:Pmax) which can be achieved. Using a pneumatically controlled boiler, this range is typically 1:5-1:7, possibly reaching 1:10 with the use of special, expensive Venturi mixer devices, but without having the advantages of a closed-loop system. For an electronically controlled boiler, a range of modulation comparable to that of pneumatically controlled boilers is required as a minimum, but boiler manufacturers have the need to achieve higher values from 1:10 up to 1:15 and above. This poses two main problems, one relating to the ability of the sensor means to detect the quality of combustion through the range of modulation, and the other relating to the ability to deliver air and gas within this wide range of modulation.

As regards the regulation of the gas, conventional electrically modulated valves have a range of modulation (Qgas_max:Qgas_min) of which the limit is defined by the design of the valve. Given that the electronic control of the combustion has to work with a wide range of gases within one or more families, and not with just one type of gas, the gas flow rates (Qgas) are considered on the basis of the worst-case scenario within the range of possible gases in use, from among those which the system has to support.

The maximum gas flow rate (Qgas_max) is typically achieved by using a nozzle in the output conduit, the size of which is suitable for achieving the maximum power (Pmax) with the gas having the lowest Wobbe index. On the basis of the dimensions of this nozzle, and for a given valve, a minimum flow rate (Qgas_min) which will correspond to a given power will be achieved. Since the worst-case scenario has to be considered, the calculation of the minimum power (Pmin) corresponding to this minimum flow rate (Qgas_min) is based on the gas having the highest Wobbe index. It follows that, in the prior art, the valves have a gas flow rate modulation capacity which is insufficient both for achieving the required wide range of modulation and for being able to adapt automatically to a different type of gas.

DISCLOSURE OF THE INVENTION

A primary object of the invention is to provide a method for driving a modulating valve for regulating the flow rate of fuel gas towards a burner, in particular for condensation boilers having high power modulation, designed to overcome the limits mentioned in reference to the cited prior art, and in particular able to widen the range of modulation of the minimum flow rates which can be delivered in a controlled manner by lowering the average value of the above-mentioned minimum flow rate (Qmin).

This object, and others which will become more clearly apparent in the following, are achieved by the invention by way of a driving method implemented in accordance with the appended claims.

BRIEF DESCRIPTION OF THE DRAWINGS

The features and advantages of the invention will become clearer from the following detailed description of some preferred embodiments thereof, explained by way of non-limiting example, with reference to the accompanying drawings, in which.

PREFERRED EMBODIMENT OF THE INVENTION

Figure 1:
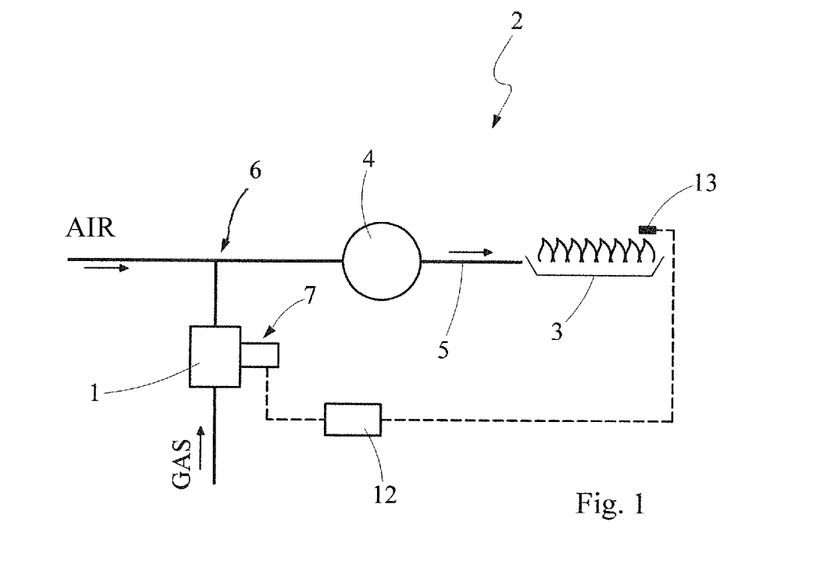
FIG. 1 is a schematic view of a valve for regulating the gas flow rate to a burner comprising an air/gas mixing system operating using the method according to the invention.

Referring first to FIG. 1, a valve for controlling the delivery of a fuel gas, operating in accordance with the method of the present invention, is denoted as 1 and shown merely schematically. The valve is associated with a boiler plant, preferably a condensation boiler plant, labelled as a whole as 2, including a premix burner apparatus 3 which has a modulable thermal power and the flame of which is intended to heat an intermediate fluid circulating in the boiler plant.

The burner apparatus 3 is of the forced-ventilation type, and for this purpose the use of a fan 4 is provided, positioned in the suction or inlet of the air/gas fuel mixture heading to the burner. In the example of FIG. 1, a conduit 5, in which a mixing zone 6 is defined between the airflow supplied by the fan 4 and the gas flow delivered by the valve 1, extends between the fan 4 and the burner.

The thermal power achievable at the burner can be regulated (depending on the rate of rotation of the fan) within a preset range of modulation between the maximum achievable power (Pmax) and the minimum achievable power (Pmin).

So as to be able to modulate the thermal power at the burner 3 within said range of modulation, it is provided that the valve 1 is operatively associated with a modulator device, labelled as a whole as 7, by means of which the valve can modulate the delivered flow rate (for example by modulating the output pressure of the valve or by modulating the clear section for the gas passing through the valve).

The valve 1 comprises a valve seat 1a associated with a particular closure member 1b and an operating means, labelled as a whole as 8 and directly associated with the closure member 1b so as to direct it in a controlled movement relative to the valve seat 1a.

Figure 2:
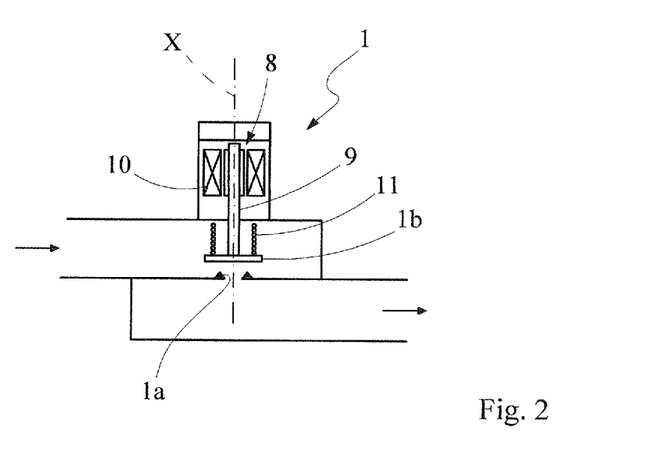
FIG. 2 is a schematic view of the valve of the preceding figure.

In FIG. 2, the valve is shown purely schematically as a flow rate regulator, but it will be understood that the valve can be configured as a pressure regulator. Said operating means 8 expediently comprises a rod-shaped member 9 that is displaceable in a translational manner, while rigidly connected to the closure member 1b, in an axial direction labelled as X in the drawings, and is continuous or stepped, such that the member 9 can assume a plurality of positions in the direction X in a controlled translational movement. In a preferred example, the operator is in the form of an electrical actuator, and more specifically of an electromagnetic actuator, in which the member 9 is in the form of a movable core of a continuous electromagnet formed by a solenoid 10. In this configuration, the spatial positions of the member 9 in the X direction are proportionally related to (for example linearly proportional to) the strength of the electrical signal (for example the current strength) sent to the control electromagnet.

Reference numeral 11 denotes a resilient return means, formed for example as a spring system, capable of pushing the closure member towards a closed safety position of the valve seat 1a.

It is understood that other modulator devices may effectively be provided for operating in accordance with the method of the present invention, for example by using stepper motors or other similar types of modulators.

The electrical control signal of the modulator device is generated by a control logic implemented in a printed circuit board 12 which oversees the operation of the burner.

In the board 12, a signal from a sensor 13 for controlling the combustion is expediently also generated, so as to identify the appropriate supply current values of the modulator and speed values of the fan for generating the required thermal power using high-efficiency combustion while minimising the emission of undesirable combustion residues such as CO and NOx.

Figure 3:
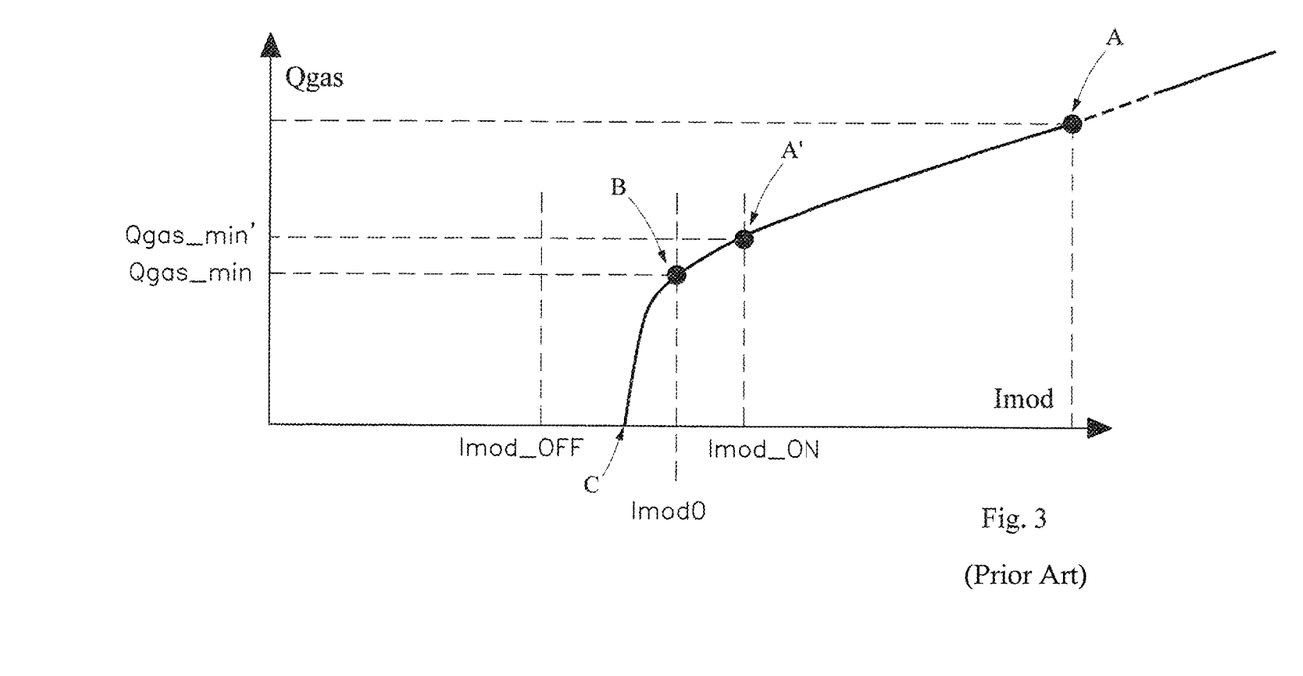
FIG. 3 is a graph showing the characteristic curve of the delivered gas flow rate as a function of the current strength at the modulator of a conventional valve.

In the following, reference is made in particular to the graph of FIG. 3, which shows the region of the characteristic curve expressing the relationship between the current signal (Imod) supplied to the valve and the gas flow rate (Qgas) delivered thereby, for low gas flow rates. The curve has some characteristic points. The point A corresponds to a generic deliverable flow rate condition of the valve that is achieved for a corresponding current value along the characteristic curve, distinguished by a proportionality relationship, preferably linear proportionality. Moving along the curve, as the current Imod sent to the modulator decreases, a corresponding flow rate is thus achieved as a function of said linear proportionality, at least as far as the point B on the curve, distinguished by a current value Imod0 corresponding to a minimum flow rate value (Qgas_min) deliverable in a controlled manner, with said proportionality relationship. For current values below Imod0, due to the constructional limits of the valve, said valve is no longer able to deliver gas in a controlled manner, and rapidly ceases to deliver gas, proceeding along the curve line (base of the curve) extending between points B and C. For current values, labelled as Imod_OFF, of less than that distinguishing point C, the gas flow rate is definitely zero.

A' labels a point on the curve at which the flow rate (Qgas_min') is slightly greater than the minimum (Qgas_min) which the valve can deliver in a controlled manner, the flow rate definitely being non-zero at this point. The current sent to the modulator for the point A' on the curve is labelled as Imod_ON (Imod_ON>Imod0).

In a preferred, non-limiting embodiment, the current Imod sent from the modulator 7 to the solenoid 10 of the electromagnetic actuator is an average current obtained by periodic square-wave PWM (pulse-width modulation) (with levels ON/OFF) of a voltage at a suitable frequency f', also known as a carrier frequency. As is known, the duty cycle of the wave, denoted as dc', expressed as the ratio of the length of the high level (ON) of the signal to the period of the wave, is related to the desired average current. In other words, to modulate the current Imod along the characteristic curve, and in particular for the region of low flow rates, along the line extending from point A to point B, the duty cycle of the carrier signal sent to the electromagnet is gradually proportionally decreased.

The carrier frequency f' of the PWM voltage signal is chosen in such a way that the harmonic components are substantially filtered out of the inertia of the mass of the movable core, the position of which is thus basically determined by the continuous component (average value) of the current passing through the solenoid.

Figure 4:
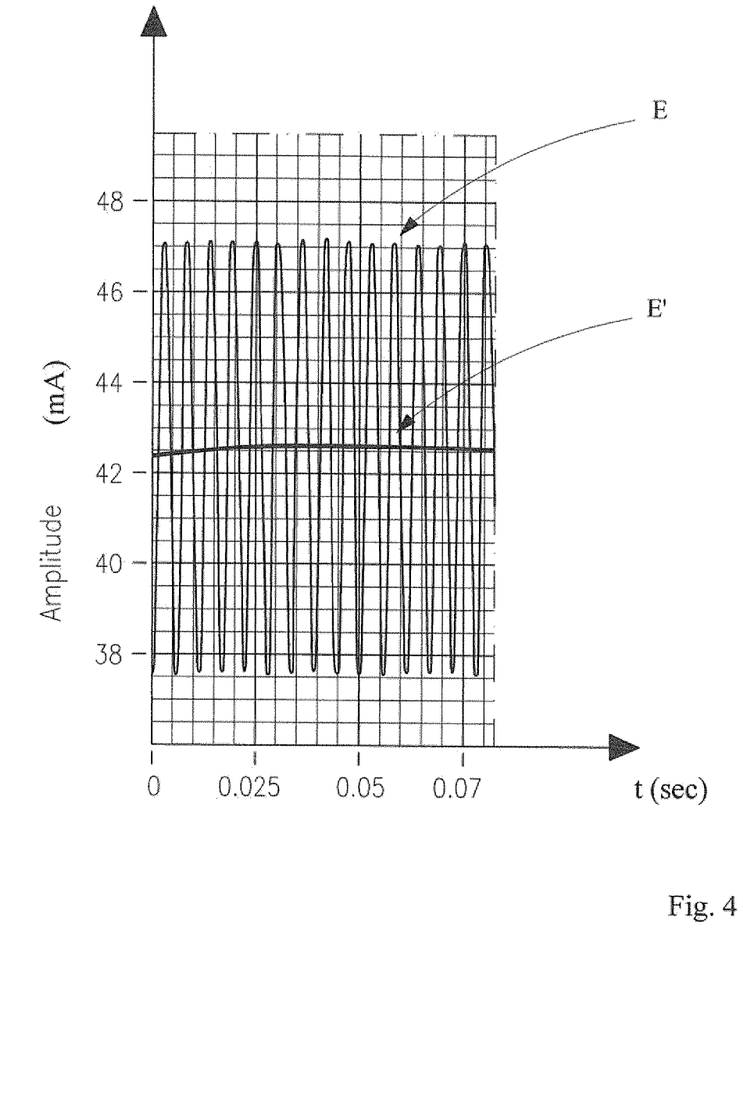
FIG. 4 is a graph showing a PWM current carrier signal which supplies current to the modulator of the valve of FIG. 2.

FIG. 4 shows a typical progression of the instantaneous current signal (curve E) passing through the solenoid of the modulator over time (t) for a preselected duty cycle. Reference sign E' labels the curve of the progression of the average current, which determines the force to which the movable core of the modulator is subjected. It is thus provided that the carrier frequency f' of the PWM signal is chosen to have a sufficiently low value that the harmonics are not completely filtered out of the inertia of the movable core, but there is a residual oscillating movement of small magnitude but sufficient to cause it to operate constantly under both dynamic and static friction conditions, so as to achieve a substantial reduction in hysteresis in the characteristic curve of the valve (Imod/Qgas).

Referring to FIG. 4, in the embodiment described, the carrier frequency f' of the PWM voltage driving signal is chosen to be 180 Hz.

In accordance with a principle characteristic of the driving method of the present invention, it is provided that controlled gas flow rates less than the aforementioned minimum flow rate (Qgas_min) can be delivered by way of the valve 1, thus widening the range of modulation in the minimum values of the deliverable flow rates.

Figure 5:
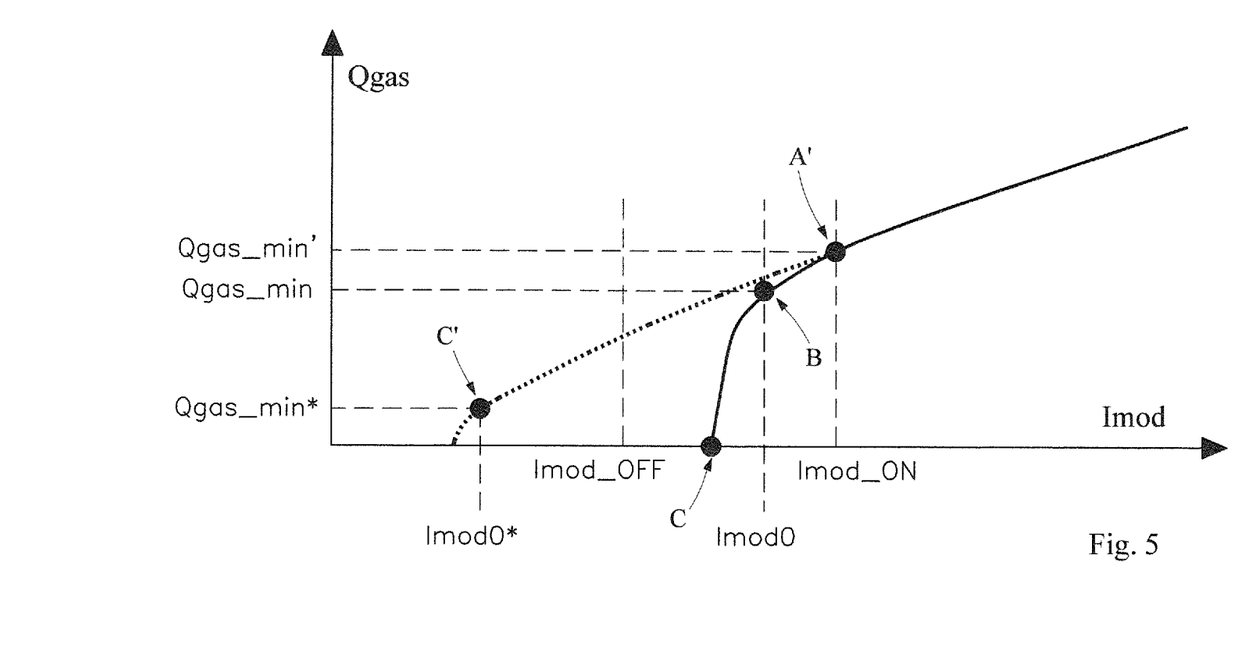
FIG. 5 is a graph corresponding to that of FIG. 3, showing the characteristic curve achievable be operating using the method for driving the valve according to the invention.

To describe the claimed driving method in detail, reference is made in the following to the graph of FIG. 5, which reproduces the characteristic curve of FIG. 3.

The method provides that, upon reaching point B on the curve, or preferably upon reaching point A', at which the gas flow rate is reliably non-zero and slightly greater than the minimum flow rate which the valve can deliver using the aforementioned known driving method, so as to deliver flow rates lower than the minimum flow rate (Qgas_min) in a controlled manner, a PWM voltage signal capable of generating a particular PWM current signal, identified as Imod', is sent to the electromagnet of the modulator so as to move the closure member 1b on the basis of said second signal, said signal Imod' having the features described in the following.

By presetting, as specified in detail below, a suitable frequency of the signal Imod', known as the pulsed injection frequency and denoted as fp, the method provides driving the modulator in such a way that the valve delivers gas intermittently, on the basis of the duty cycle dc imposed on the PWM signal Imod'. As the signal alternates between the high and low levels, the valve delivers corresponding high-level and low-level or zero flow rates as a result, generating an intermittent gas delivery capable of creating, after the mixing, an alternation between adjacent rich and poor mixing "packets", transported as far as the point where the combustion takes place, mixing between the inhomogeneous mixing packets being able to take place in the time required for reaching the burner so as to guarantee stability and efficiency of combustion.

As regards the PWM signal Imod', the pulsed injection frequency fp is chosen to be a value greater than the natural response frequency fm of the mixing system (understood to be the mechanical frequency of the assembly including the fan 4 and the conduit 5 having the air/gas mixing zone) and is further chosen to be a value less than the natural response frequency fv of the valve 1 (understood to be the mechanical frequency defined by the masses, the spring system, the static and dynamic frictions, the inductance of the magnetic circuit, etc.).

A preferred choice provides that the pulsed injection frequency fp is more than twice the natural response frequency fm of the mixing system and less than half the natural response frequency fv of the valve.

By way of non-limiting example, a value indicative of the pulsed injection frequency fp in the preferred embodiment described here may be approximately 10 Hz.

Still in relation to the PWM signal Imod', with Ta and Tb denoting the respective lengths of a first and a second mutually successive time interval, which are associated with the high signal and low signal respectively and the sum of which is equal to the period T of the signal Imod' (T=1/fp), with a duty cycle dc equal to the ratio Ta/T, it is provided that the strength of the current signal Imod' is modulated:
either by amplitude modulation of the signal Imod', leaving the duty cycle dc constant (Ta/T=const.), so as to vary the flow rate (Q) accordingly, or
by modulation of the duty cycle dc in the period T, keeping a preset amplitude of the signal Imod' constant relative to the first time interval (Ta), so as to vary the delivered gas flow rate accordingly.

For the first modulation operating mode, using amplitude modulation, the maximum amplitude of the signal Imod' is preferably chosen to be substantially equal to the value Imod0 (point B on the curve) below which the valve can no longer deliver controlled gas flow rates, or alternatively the amplitude may be chosen to be equal to the value Imod_ON (point A' on the curve), said amplitude being gradually decreased so as to decrease the delivered flow rate Qgas in a proportionally related manner, thus achieving flow rate values lower than the minimum flow rate Qgas_min'.

Figures 6, 6A:
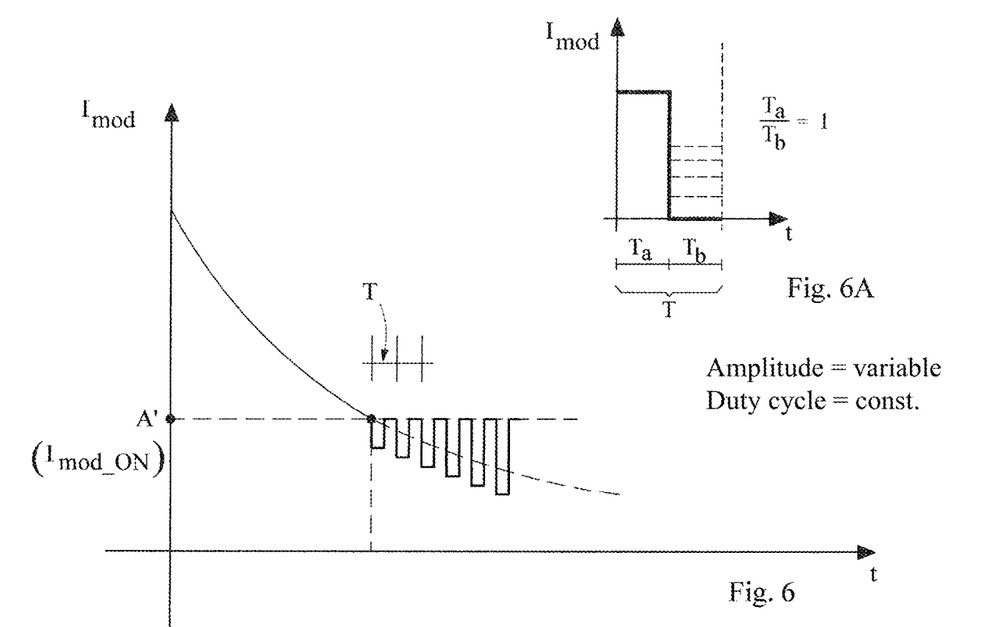
FIG. 6 is a graph showing the progression over time of the current signal at the modulator in accordance with a first modulation operating mode for modulation in accordance with the method of the invention.
FIG. 6A is a graph of the PWM signal implemented using the modulation operating mode for modulation shown in FIG. 6.

FIG. 6 is a qualitative graph of the progression of the amplitude of the time-modulated current strength Imod, keeping the pulsed duty cycle dc constant (assuming Ta/Tb=1 in the example described here). In this case, using amplitude modulation, the amplitude can be decreased, starting from the point A', so as to modulate (by decreasing) the current strength Imod (for example by varying the duty cycle of the carrier signal) and therefore to modulate the deliverable flow rate in a proportionally related manner. The characteristic curve line which can be obtained (with virtually linear proportionality) is shown as a dashed line in FIG. 5, and extends from the point A' to the point C', where a flow rate Qgas_min* less than the minimum flow rate Qgas_min can be delivered.

FIG. 6A is a sketch of the signal Imod' in the period T, subjected to amplitude modulation while keeping Ta/Tb constant and preferably chosen to be 1.

In relation to the second modulation operating mode, using modulation of the pulsed duty cycle dc, the amplitude of the signal Imod' is preset in advance. It may for example expediently be chosen to be equal to the difference between Imod_ON and Imod_OFF (preset amplitude=Imod_ON−Imod_OFF). By modulating the pulsed duty cycle dc, modulation of the delivered gas flow rate in a proportionally related manner is thus achieved, for example by implementing the (dashed) characteristic curve line extending between points A' and C' in the graph of FIG. 5.

Figures 7, 7A:
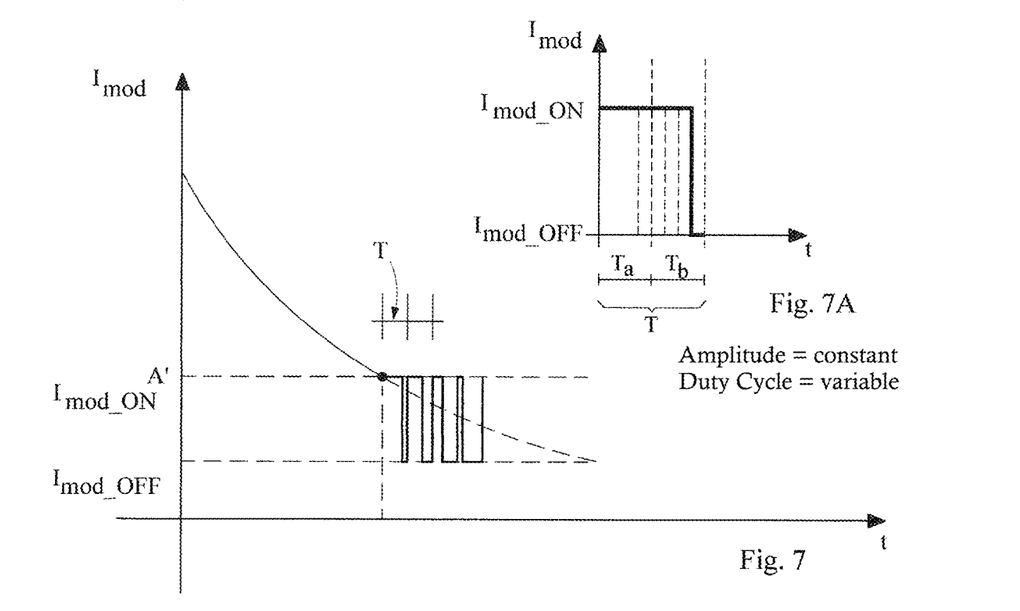
FIG. 7 is a graph corresponding to that of FIG. 6 for a second modulation operating mode for modulation in accordance with the method of the invention.
FIG. 7A is a graph of the PWM signal implemented using the modulation operating mode for modulation shown in FIG. 7.

The graphs for this second modulation operating mode corresponding to those of FIGS. 6 and 6A are shown in FIGS. 7 and 7A, respectively.

For both of the aforementioned modes of operation, it is thus found that using the above-described driving it is possible, using the valve 1, to deliver controlled gas flow rates lower than the flow rate Qgas_min' (point A' on the curve), it being possible to extend the range of modulation into minimum gas flow rate values as far as the point C' on the curve (Qgas_min*, Imod0*).

In principle, the characteristic curve line from point A' to point C' could also be achieved by combining the first and second above-described modes of operation for modulating the strength of the current signal Imod', thus combining amplitude modulation with modulation of the pulsed duty cycle.

Figure 8:
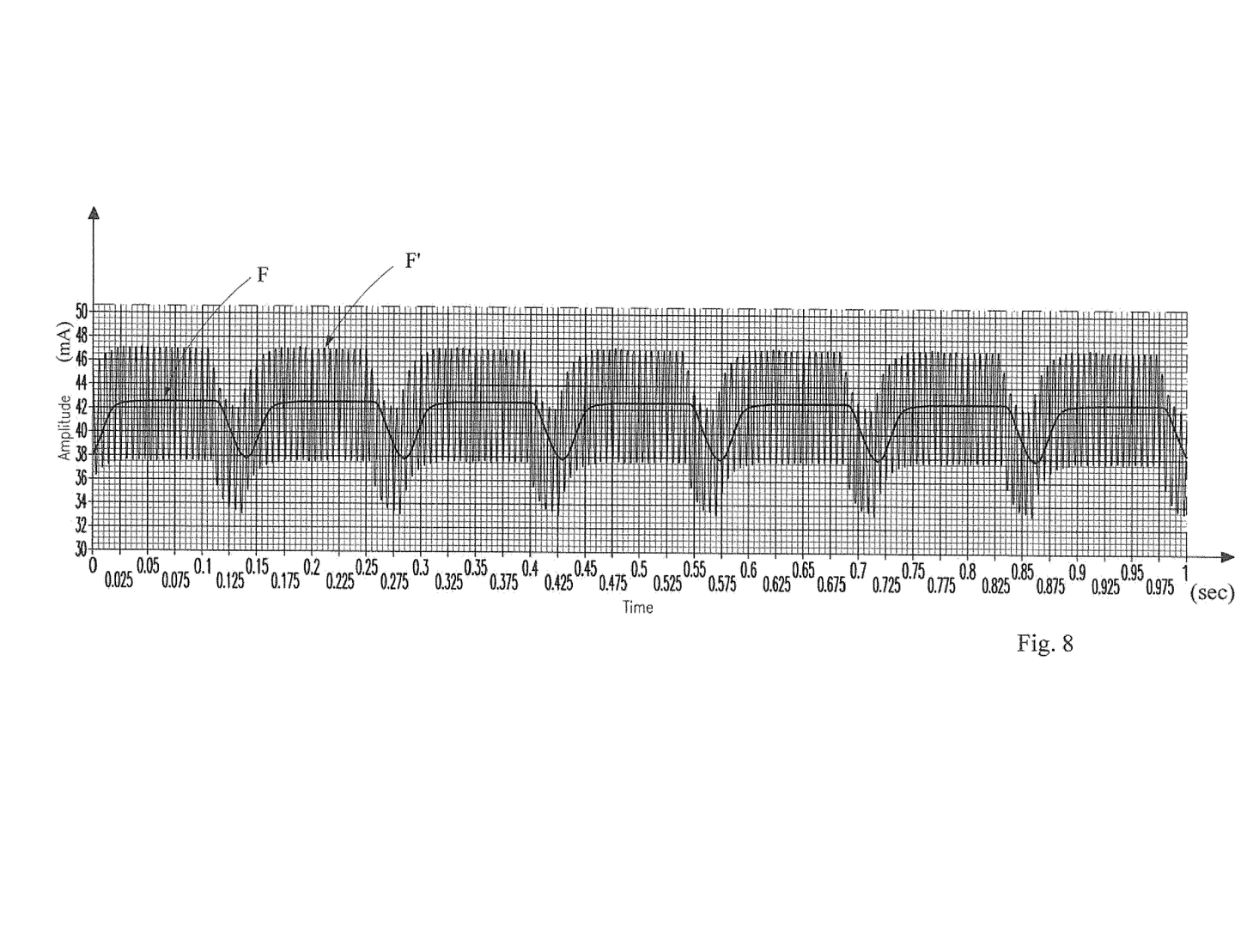
FIG. 8 is a graph showing a PWM current signal which supplies current to the modulator of the valve of the preceding figures in accordance with the method of the invention.

FIG. 8 is a graph of the progression of the current signal (Imod) sent to the modulator by applying the driving method just described.

In this case, the driving voltage PWM carrier has a carrier frequency f' of 180 Hz. The pulsed injection frequency fp is chosen to be 7 Hz, corresponding to a period of 0.1428 s (T=1/7 s), in which there is an alternation between Imod_ON, chosen to be 42.5 mA, and Imod_OFF, chosen to be 37.5 mA. The curve F on the graph represents the average current signal Imod whilst the curve F' represents the instantaneous current Imod. In the oscillating part of the curve F', the residue cannot be seen in the instantaneous current Imod. This intermittent gas delivery, if continued unchanged during the transport to the point where the combustion takes place, specifically at the burner 3, would result in a pulsing flame or even in the flame being extinguished. In reality, the point (in the mixing zone 6) where the gas is injected into the airflow is always located at a certain distance of a few tens of centimetres from the burner. Given that this operation takes place at very low powers, the flow of the air/gas mixture also ends up rather low, since the adjacent rich/poor mixing "packets" produced by the pulsed injection require some time before they arrive near the burner. In this time, by the known laws of gas diffusion, the initially inhomogeneous packets tend to have homogeneous gas concentrations after a certain amount of time. Furthermore, since the fan is positioned between the mixer and the burner in almost all air/gas systems of boilers, the inhomogeneous packets are suitably mixed by the vortex movement brought about by the fan.

As stated above, the pulsed injection frequency fp should be subjected to two constraints. It should be less than the response frequency of the valve, in other words should not be greater than the speed at which the valve has to carry out the opening/closing cycles. Furthermore, the pulsed injection frequency should not be too low such that the above-stated diffusion and mixing phenomena fully take place. In practice, if the minimum power to be achieved is taken into consideration, there is a particular air/gas mixture flow rate corresponding thereto. Since the dimensions (section and width) of the conduits from the mixer to the burner are known, it is possible to calculate the speed of the mixture; using this speed, it is possible to calculate the space passed through by the mixture over a period corresponding to the pulsed injection frequency. This space which is passed through must be a fraction of the length of the passage from the mixer to the burner; from this, the minimum value which the pulsed injection frequency should have is calculated.

This value will be lower than the operating power, and this expediently combines with the fact that this method of driving the valve is applied in the low-power region.

A further advantage stems from the fact that the method according to the invention does not require substantial modification of the valve, but is essentially based on a particular definition of the electrical signal applied to the modulator of the valve. The application of this method does not require substantial modifications to the electronic control hardware either, and can in principle be achieved by modifications to the electronic control firmware, with obvious cost advantages in relation to the use of a more complex and sophisticated valve.

The invention thus achieves the objects proposed, resulting in the stated advantages over known solutions.

The invention claimed is:

1. A method for driving a device for modulating a valve (1) regulating a flow rate of gas towards a burner (3) of a condensation boiler comprising a fan (4) and a conduit (5) extending between an air-gas mixing zone (6) and the burner (3), the valve (1) including a valve seat (1a) associated with a closure member (1b), and an electrical operating means (8) capable of controlling displacement of said closure member (1b) relative to the valve seat (1a) so as to regulate by modulation the flow rate of gas (Qgas) delivered, the operating means (8) comprising at least one electromagnet, the valve (1) being designed so as to operate in accordance with a characteristic curve of proportionality, the flow rate (Qgas) delivered being proportionally related to the strength of a first current signal (Imod) sent to said electromagnet such that the flow rate (Qgas) can be modulated, using said characteristic curve of proportionality, within a range of modulation between a maximum flow rate (Qgas_max) and a minimum flow rate (Qgas_min), said minimum flow rate corresponding to a value (Imod0) of said first current signal, below which the valve is not capable of delivering gas according to the characteristic curve of proportionality, wherein to deliver controlled flow rates (Qgas) of gas that are below said minimum flow rate (Qgas_min), thereby extending the range of modulation into minimum deliverable flow rate values, provision is made to:

drive the electromagnet of the modulator with a pulse width modulation (PWM) voltage signal capable of generating a second current signal (Imod') in said electromagnet, so as to move said closure member (1b) according to said second current signal (Imod'), wherein a frequency (fp) of said second current signal (Imod') is chosen from a value higher than a natural response frequency (fm) of the air-gas mixing system and a value lower than a natural response frequency (fv) of the valve, and first (Ta) and second (Tb) time intervals correspond to successive durations of a high signal and a low signal, respectively, the sum of which is equal to a period (T) of said second current signal, with a duty cycle (dc) equal to the relationship Ta/T, the strength of said second current signal (Imod') is modulated:

by amplitude modulation of the second current signal (Imod'), leaving the duty cycle (dc) constant (i.e. Ta/T=const.), so as to vary the flow rate (Qgas) accordingly, or by modulation of the duty cycle (dc) in the period (T), keeping a preset amplitude of the second current signal (Imod') constant relative to said first time interval (Ta), so as to vary the flow rate (Qgas) delivered accordingly.

2. The method according to claim 1, wherein, when operating with amplitude modulation, the maximum amplitude of the second current signal (Imod') is chosen to be substantially equal to or slightly greater than said value (ImodO) of the first signal, below which the valve is not capable of delivering gas according to the characteristic curve of proportionality, said amplitude being progressively reduced in order to reduce the flow rate (Q) delivered in a proportionally related manner, so as to achieve deliverable flow rate values below said minimum flow rate (Qgas_min).

3. The method according to claim 1, wherein, when operating by means of modulation of the duty cycle (dc), the value of the amplitude of the signal (Imod') relative to the first time interval (Ta) is chosen with the relationship:

$$Imod'=Imod0-Imod\_OFF,$$

where Imod_OFF is a current signal value for which, if applied to the valve, no flow rate of gas (Qgas=0) is delivered.

4. The method according to claim 1, wherein the frequency (fp) of the second current signal is chosen to be more than twice the natural response frequency (fm) of the mixing system.

5. The method according to claim 1, wherein the frequency (fp) of the second current signal is chosen to be less than half the natural response frequency (fv) of the valve.

6. The method according to claim 1, wherein the first current signal (Imod) for delivering a flow rate (Qgas) in the range of between said maximum flow rate (Qgas_max) and said minimum flow rate (Qgas_min) according to the characteristic curve of proportionality is generated by a pulse width modulation (PWM) voltage signal, with a preselected carrier frequency (f'), wherein the strength of the first signal is modulated according to its corresponding duty cycle (dc'), and wherein, when operating by means of amplitude modulation of the second current signal (Imod'), said amplitude is varied by varying the duty cycle (dc') of the first current signal (Imod).

7. The method according to claim 1, wherein, when operating by means of amplitude modulation, a ratio between the first and second time interval (Ta, Tb) is equal to 1.

* * * * *